United States Patent

Sugawara et al.

[11] Patent Number: 5,733,402
[45] Date of Patent: Mar. 31, 1998

[54] METHOD FOR PRODUCING ELECTRICALLY INSULATED COILS

[75] Inventors: Katsuo Sugawara, Hitachi; Tohru Koyama, Hitachishi; Syoichi Maruyama, Yamatsuri, all of Japan

[73] Assignee: Hitachi, Ltd., Tokyo, Japan

[21] Appl. No.: 636,768

[22] Filed: Apr. 19, 1996

[30] Foreign Application Priority Data

Apr. 27, 1995 [JP] Japan ................................. 7-103943

[51] Int. Cl.$^6$ ................................................. B32B 31/00
[52] U.S. Cl. ..................... 156/185; 156/53; 156/307.5; 174/120 C; 174/121 SR
[58] Field of Search ................. 156/185, 53, 307.5; 174/120 C, 121 SR

[56] References Cited

U.S. PATENT DOCUMENTS

| | | | |
|---|---|---|---|
| 3,556,925 | 1/1971 | Mertens | 156/53 |
| 3,960,803 | 6/1976 | Smith et al. | 156/53 |
| 4,033,805 | 7/1977 | Mitsui et al. | 156/185 |
| 4,204,181 | 5/1980 | Smith et al. | |

OTHER PUBLICATIONS

Journal of Applied Polymer Science, vol. 41, pp. 319–328 (1990) "Transition Metal Chelates as Accelerators for Epoxy Resin Systems–Studies with Cobalt (III) Acetylacetonate".

*Primary Examiner*—John J. Gallagher
*Attorney, Agent, or Firm*—Antonelli, Terry, Stout, & Kraus, LLP

[57] ABSTRACT

In the production of electrically insulated coils which make up insulating layers, insulating material is wound around an electric conductor to form an insulating substrate, then impregnating varnish consisting of thermosetting resin is applied to the insulating substrate and hardened. In this electrically insulated coil production method, the impregnating varnish is made up of acid anhydride setting epoxy resin elements that include latent accelerators. These accelerators take more than 30 days to increase their initial viscosity by three times during storage at 25 degrees centigrade. After the insulating substrate is impregnated with the varnish, the substrate is heated at a temperature which will cause the impregnating varnish on the surface of the insulating substrate to lose its fluidity in under 30 minutes in order to preset the varnish. Next, the varnish is set at a heat at least 10 degrees centigrade lower than the presetting temperature and thereby, electrically insulated coils with high reliability are obtained.

24 Claims, No Drawings

METHOD FOR PRODUCING ELECTRICALLY INSULATED COILS

BACKGROUND OF THE INVENTION

This invention is related to the electrically insulated coils used in rotating electrical machinery and transformers, especially electrically insulated coils for which impregnating varnish is used repeatedly for the insulating layer.

The demands for smaller and lighter rotating electrical machinery for vehicles and general industrial use is stronger than ever. The electrically insulated coils used in this machinery must be capable of insulating high voltages and have high heat resistance.

The insulating layers of this type of electrically insulated coil are formed of woven or unwoven fabric made of inorganic or organic textiles (such as glass fiber or polyamide), and insulating tape material made of mica, organic high polymer film and binder resins. These materials are wound around the conductor to the specified thickness to form the covering layer. Next a thermosetting varnish with low viscosity (such as unsaturated polyester resin, epoxy resin or silicone resin) is vacuum or pressure impregnated in the covering layer, and allowed to harden.

Epoxy resins are commonly used as the impregnating varnish because they have good all around properties. Although epoxy resins have many different setting properties, they all have low viscosity, good impregnating properties and are easy to handle. In addition, because the various properties of the hardened resins are good, low viscosity acid anhydride epoxies and hardening epoxies are commonly used.

Although the pot life of acid anhydride setting epoxy resins is long, their setting time is also long, so that setting accelerators are used. In general, the viscosity increase rate rises when setting accelerators are directly added to resins, so that the time the resins can be used for impregnation work (pot life) is shortened. Therefore, various types of setting accelerators with high potentials have been developed so that the pot life of impregnating varnishes stay long even after the accelerators have been added.

For example the following accelerators are well known: imidazole compounds, boron trifluoride amine compounds, quaternary phosphonium compounds, tertiary amine and epoxy addition reaction products, tetraphenylboron complexes, various metal acetylacetonates, naphthenic acid metal salts, and octanoic acid metal salts.

Another method which has been proposed is to put accelerators in capsules, and then place these capsules in the resin. These capsules are dissolved when the resin is heated to a certain temperature and the accelerator is then dissolved in the resin. The capsules tend to break when the resin is agitated, however, thereby reducing pot life, and they also tend to sink to the bottom of the resin when in storage, so that the accelerator effectiveness is reduced. Because of these undesirable features, this method was not found to be satisfactory for practical use.

When setting accelerators with high potential are added to impregnating varnishes, the setting times are longer because of the low setting properties of the accelerators. When these accelerators are used with conventional heat setting, the resin impregnated in the insulating layer tends to seep out.

For instance, the various metal acetylacetonates, naphthenic acid metal salts, and octanoic acid metal salts have very good potential, but they have inferior setting properties. In heat setting as described above, the resin impregnated in the insulating layer seeps out during hardening, so that the performance of the insulating layer is not always sufficient.

Because of these reasons, setting accelerators are commonly added to the insulating tape side, rather than adding them to the impregnating varnishes. The three methods described below are used to achieve this "painting."

(1) Add setting accelerator to the binder resin when making insulating tape.

(2) Add setting accelerator to the insulating tape by dipping the tape in the setting accelerator solution.

(3) After wrapping insulating tape around the coil conductor, add setting accelerator to the insulating tape layer by impregnating the insulating tape layer with setting accelerator.

When an insulating coil is made with any of the above methods, however, the setting accelerator is mixed with the varnish from the surface of the coil insulating layer, so that the amount of accelerator is small. As a result, the varnish on the surface of the insulating layer will not set sufficiently, and, depending on the conditions, the surface of the coil will be left sticky with unset varnish. Furthermore, the amount of varnish which will seep away from the insulating layer surface will increase, so that the performance of the insulating coil will not be sufficient.

Therefore, in order to cope with the need for diversification, increased productivity and rationalization of electrically insulated coils with impregnated varnish, it is easier to use impregnating varnish with setting accelerator added to it, rather than adding setting accelerators to the insulating layer.

In the aforementioned conventional methods of producing electrically insulated coils by impregnating varnish in the insulating layer including both the method of applying setting accelerator to the insulating tape and the method of adding high potential accelerators, such as the various metal acetylacetonates, naphthenic acid metal salts, and octanoic acid metal salts, to the impregnating varnish, none of the methods could both satisfy the impregnating varnish pot life requirements and insulating coil performance requirements after hardening.

SUMMARY OF THE INVENTION

The object of this invention is to provide a highly reliable electrically insulated coil production method which maintains a long impregnating varnish pot life, and reduces the amount of impregnating varnish which seeps out of the insulating coils and provides the insulating coils with a uniform insulating layer.

The major points of this invention to achieve the above object are as follows:

(1) In the production of electrically insulated coils which make up insulating layers, insulating material is wound around an electric conductor to form an insulating substrate, then impregnating varnish consisting of thermosetting resin is applied to the insulating substrate and hardened.

In this electrically insulated coil production method, the impregnating varnish is made up of acid anhydride setting epoxy resin elements that include latent accelerators. These accelerators take more than 30 days to increase their initial viscosity by three times during storage at 25 degrees centigrade. After the insulating substrate is impregnated with the varnish, the substrate is heated at a temperature which will cause the impregnating varnish on the surface of the insulating substrate to lose its fluidity in under 30 minutes in order to preset the varnish. Next, the varnish is set at a heat at least 10 degrees centigrade lower than the presetting temperature. This is the feature of this production method.

(2) An electrically insulated coil production method in which the presetting temperature is from 170 to 250 degrees centigrade.

The above impregnating varnish is made up of acid anhydride setting epoxy resin components with high latent accelerator added to it. In addition, the surface of the insulating layer is preset at a temperature which will cause the impregnating varnish to lose its fluidity within 30 minutes after it is applied, and the rest of the setting is allowed to take place at a temperature which is at least 10 degrees centigrade lower than the presetting temperature. This will allow both a long pot life for the impregnating varnish and good electrically insulated coil performance.

The latent accelerator is chosen from metal acetylacetonates, metal benzoylacetonate, metallic naphthenates, and metallic octanoates. From 0.05 to 2 parts latent accelerator (preferably 0.1 to 0.5 part) is added to 100 parts of impregnating varnish. This latent accelerator is dissolved in warm acid anhydride, and then is mixed with epoxy so as to provide varnish. The insulating material of the electric conductor is impregnated with this varnish, and it is heated to preset the varnish, so that the varnish on the surface of the insulating layer loses its fluidity within 30 minutes. The heating temperature at this time is from 170 to 250 degrees centigrade, preferably from 180 to 230 degrees centigrade.

After presetting, the insulating layer is allowed to harden at a temperature which is at least 10 degrees centigrade lower than the presetting temperature.

According to this invention, the impregnating varnish loses its fluidity because of the presetting temperature which is higher than the setting temperature. This prevents the varnish impregnated in the insulating layer from seeping out and, thereby, improves the performance of the insulating layer, so that a highly reliable electrically insulated coil can be produced.

In addition, the pot life of the varnish can be improved by using latent accelerators.

DETAILED DESCRIPTION OF THE PREFERRED EMBODIMENTS

The specifics of this invention shall be explained through a description of various embodiments. The abbreviations of the epoxy resins, hardening agents and setting accelerators used in the embodiments are listed below.

[Epoxy Resins]

1) YL-932 (Mitsubishi Petrochemical/Shell epoxy product name): 1,1,3-tris methane [p-(2,3-epoxy propoxy) phenyl] (trifunctional): epoxy equivalent 161

2) L-2832 (Mitsubishi Petrochemical/Shell epoxy product name): Mixture of trifunctional and bifunctional bisphenol A epoxy: epoxy equivalent 180

3) DER-332 (Dow Chemical product name): Bifunctional bisphenol A epoxy: epoxy equivalent 175

4) EXA-4750 (Dai Nippon Ink & Chemicals Inc.): Trifunctional naphthalene ring epoxy: epoxy equivalent 187

5) HP-4032 (Dai Nippon Ink & Chemicals Inc.): Bifunctional naphthalene ring epoxy: epoxy equivalent 151

[Acid Anhydride Hardening Agents]

1) MHAC-P (Hitachi Kasei Kogyo product name): Methyl hymic acid anhydride: anhydride equivalent 178

[Malaymide]

2) MP-2000X (Mitsubishi Petrochemical product name): Multifunctional malaymide

[Setting Accelerators]

1) Co (III) AA (Aldrich): Cobalt (III) acetylacetonate

2) Mn (III) AA (Wako Junyaku Kogyo): Manganese (III) acetylacetonate

3) MnNA (Nippon Kagaku Sangyo): Naphthenic acid manganese

4) ZnNA (Nippon Kagaku Sangyo): Naphthenic acid zinc

5) MnOC (Nippon Kagaku Sangyo): Octanoic acid manganese 6) 2E4MZ (Shikoku Kasei Kogyo product name): 2-ethyl-4-methylimidazole 7) 2PZ-CN (Shikoku Kasei Kogyo product name): 1-cyanoethyl-2phenylimidazole 8) TPP-K (Tokyo Ohka Kogyo): Tetraphenylphosphine, tetraphenylborate 9) $BF_3$-MEA (Hashimoto Kasei Kogyo): Boron trifluoride monoethyl amine (1) Making Insulating Tape The binder solution for making insulating tape was a methyl ethyl ketone (MEK) and tetrahydrofuran (THF) solution (mix ratio: 50:50 on a weight basis) with YL-932 and MP-2000X (mix ratio: 70:30 on a weight basis) dissolved in it, so that the density of the nonvolatile portion was about 20 percent of the weight.

The binder solution was used to cement an unfired soft laminated mica sheet and glass cloth, and the solvents were allowed to vaporize. The glass-backed mica tape (insulating material) was made so that the nonvolatile elements of the binder made up about 10 percent of the weight (based on the total weight of the insulating material). This insulating material was cut to make 25 mm width tape.

(2) Making Insulating Coil Impregnating Varnish Epoxy Resin Composition (A)

The various setting accelerators were added to the acid anhydride hardening agent (MHAC-P), so that their quantity (percentage of weight) in relation to the total resin quantity was as shown in Table 1, then the hardening agent was heated and mixed to dissolve it (undissolved matter was left as is). After the hardening agent returned to room temperature, the L-2832 to DER-332 epoxy compound was mixed to a ratio of 30:70 (weight ratio). The acid anhydride hardening agent (MHAC-P) to epoxy compound mixture ratio was 1.05:1.

Epoxy Resin Composition (B)

The various setting accelerators were added to the acid anhydride hardening agent (MHAC-P), so that their quantity (percentage of weight) in relation to the total resin quantity was as shown in Table 1, then the hardening agent was heated and mixed to dissolve it. After it returns to room temperature, the EXA-4750 to HP-4032 compound was mixed to a ratio of 20:80 (weight ratio). The acid anhydride hardening agent (MHAC-P) to epoxy compound mixture ratio was 1.1:1.

(a) Measuring the time impregnating varnish stops being fluid: The time it took for varnish in a test tube to lose fluidity when placed in a constant temperature oil bath was measured.

(b) Impregnating varnish conditions and pot life:

Eighty ml of impregnating varnish was placed in a 100 ml screw-top bottle, and the condition of the resin when stored at a constant temperature of 25 degrees centigrade was monitored. If the setting accelerator was well distributed and did not sink to the bottom, it was considered satisfactory. If it took the resin more than 30 days to increase its viscosity by three times, then the pot life was given an up check, and if it took less than 30 days it was given a down check.

(3) Making the Electric Insulating Coil

The insulating tape in (1) above was wrapped five times around 50 mm wide by 10 mm thick by 250 mm long copper conductors, then pre-dried at 110 degrees centigrade for five hours. Next, the tapes were impregnated with the impregnating varnish in (2) above in a vacuum. These impregnated coils were placed in a heat setting furnace with the wide sides facing up and down, and were left to sit with the setting conditions indicated in Tables 2 to 5 to make the insulating layers for the model coils. The temperature of the insulating layer surfaces were measured by fixing the ends of thermocouples to the upper surface of the insulating layers.

[EMBODIMENTS 1 TO 5, COMPARISONS 1 to 5]

The furnace temperature was preset to 210 degrees centigrade. The insulated coils impregnated with varnish were placed in the furnace for one hour. Then the temperature was decreased to 180 degrees centigrade over 30 minutes, and then the insulated coils were allowed to harden for 15 hours at that temperature.

The insulated coil setting conditions, the appearance of the insulating layer, and the resin content ratios in the top and bottom insulating layers are shown in Table 2.

[EMBODIMENTS 6 TO 10, COMPARISONS 6 to 10]

The insulated coils were placed in the furnace, then the furnace temperature was increased from room temperature to 230 degrees centigrade in two hours, and the insulated coils were kept in the furnace at that temperature for one hour. Then the temperature was decreased to 210 degrees centigrade over 30 minutes, and then the insulated coils were allowed to harden for 15 hours at that temperature.

The insulated coil setting conditions, the appearance of the insulating layer, and the resin content ratios in the top and bottom insulating layers are shown in Table 3.

[EMBODIMENTS 11 TO 15, COMPARISONS 11 to 15]

The insulated coils were placed in the furnace, the furnace temperature was increased from room temperature to 210 degrees centigrade in 1.5 hours, and then the insulated coils were allowed to harden at 210 degrees centigrade for 15 hours.

The insulated coil setting conditions, the appearance of the insulating layer, and the resin content ratios in the top and bottom insulating layers are shown in Table 4.

[COMPARISONS 16 to 25]

The insulated coils were placed in the furnace, and the furnace temperature was increased from room temperature to 130 degrees centigrade in one hour. After heating for five hours at 130 degrees centigrade, the temperature was increased to 150 degrees centigrade in 30 minutes. The insulated coils were heated at this temperature for five hours, then the temperature was increased to 180 degrees centigrade in 30 minutes, and the coils were allowed to set at this temperature for 15 hours (conventional graded setting). After hardening, in all cases the furnaces were allowed to cool down to room temperature in five hours.

The insulated coil setting conditions, the appearance of the insulating layer, and the resin content ratios in the top and bottom insulating layers are shown in Table 5.

(a) Resin Content in Insulated Coils

After hardening, the insulated layers were cut out, placed in pots, then heated in electric furnaces to 700 degrees centigrade. The resin content was calculated from the mica and glass cloth residues. If the resin content in the upper insulating layer was over 95 percent of that in the lower insulating layer, then the piece passed, if not it failed.

(b) Insulating Layer Appearance Inspection

The surfaces of the model coil insulating layers were visually checked after the above curing processes for discoloring and wrinkling. This test was passed if there was no blackening, no bubbling and no wrinkling.

Adding metal acetylacetonates, naphthenic acid metal salts, and octanoic acid metal salts to the impregnating varnish and using the hardening methods of this invention clearly produces electrically insulated coil layers with better performance than conventional techniques. This is especially true in static thermosetting in which the difference between the resin content in the upper and lower insulated layers is smaller than that for conventional methods, so that highly reliable insulating layers can be created. In addition, the curing characteristics have been improved and the appearance is also better.

The model coils in these tests were hardened in a static state, but if they are rotated when curing, then the resin content in the insulating layers will be even more uniform, so this method is desirable.

The initial temperature increasing rate and maximum temperature used to harden insulated coils will depend on the type and amount of setting accelerator used, so these can be set so that the fluidity in the impregnating varnish in the insulating layer is gone in 30 minutes. In addition to the examples listed here, infrared lamps can be used to cure the surface of the insulating layers in an even shorter time.

TABLE 1

| | Impregnating varnish composition number | | | | | | | | | | | |
|---|---|---|---|---|---|---|---|---|---|---|---|---|
| | Compositions using the setting accelerators from this invention | | | | | | | Compositions using the setting accelerators from conventional methods | | | | |
| | 1 | 2 | 3 | 4 | 5 | 6 | 7 | 8 | 9 | 10 | 11 | 12 |
| Epoxy resin | (A) | (A) | (A) | (A) | (A) | (B) | (B) | (A) | (A) | (A) | (A) | (A) |
| Setting acceleration | | | | | | | | | | | | |
| Co (III) AA | 0.5 | — | — | — | — | — | — | — | — | — | — | — |
| Mn (III) AA | — | 0.5 | — | — | — | 0.5 | — | — | — | — | — | — |
| MnNA | — | — | 0.5 | — | — | — | 0.5 | — | — | — | — | — |
| ZnNA | — | — | — | 0.5 | — | — | — | — | — | — | — | — |
| MnOC | — | — | — | — | 0.5 | — | — | — | — | — | — | — |
| 2E4MZ | — | — | — | — | — | — | — | 0.5 | — | — | — | — |
| 2PZ—CN | — | — | — | — | — | — | — | — | 0.5 | — | — | — |
| TPP—K | — | — | — | — | — | — | — | — | — | 0.5 | — | — |
| $BF_3$—MEA | — | — | — | — | — | — | — | — | — | — | 0.5 | — |
| Time it took to stop varnish fluidity (minutes). Heating temperature: 170° C. | 23 | 30 | 25 | 22 | 32 | 25 | 20 | 5 | 6 | 8 | 20 | >500 |
| Varnish condition* | o | o | o | o | o | o | o | o | o | o | o | |
| Varnish pot life** Storage temperature: 25° C. | o | o | o | o | o | o | o | x | x | x | x | o |

*o: Good
**o: 30 days or more
x: Sediments; faulty distribution
x: Less than 30 days

TABLE 2

| | Embodiment | | | | | Comparison | | | | |
|---|---|---|---|---|---|---|---|---|---|---|
| | 1 | 2 | 3 | 4 | 5 | 1 | 2 | 3 | 4 | 5 |
| Resin composition number | 1 | 2 | 3 | 4 | 5 | 8 | 9 | 10 | 11 | 12 |
| Resin content ratio between the top and bottom insulating layers* | o | o | o | o | o | o | o | o | o | x |
| Appearance of the insulating layer** | o | o | o | o | o | x | x | x | x | x |
| Hardening conditions | 210° C./1 h + (210–180° C.)/0.5 h + 180° C./15 h | | | | | | | | | |

*(Upper side/lower side) × 100
o: 95 percent or greater
x: Less than 95 percent
**o: Good
x: Insulating layer surface blackened, bubbles, wrinkles.

TABLE 3

| | Embodiment | | | | | Comparison | | | | |
|---|---|---|---|---|---|---|---|---|---|---|
| | 6 | 7 | 8 | 9 | 10 | 6 | 7 | 8 | 9 | 10 |
| Resin composition number | 1 | 2 | 3 | 4 | 5 | 8 | 9 | 10 | 11 | 12 |
| Resin content ratio between the top and bottom insulating layers* | o | o | o | o | o | o | o | o | o | x |
| Appearance of the insulating layer** | o | o | o | o | o | x | x | x | x | x |
| Hardening conditions | (Room temperature - 230° C.)/2 h + 230° C./1 h + (230–210° C.)/0.5 h + 210° C./15 h | | | | | | | | | |

TABLE 4

| | Embodiment | | | | | Comparison | | | | |
|---|---|---|---|---|---|---|---|---|---|---|
| | 11 | 12 | 13 | 14 | 15 | 11 | 12 | 13 | 14 | 15 |
| Resin composition number | 1 | 2 | 3 | 4 | 5 | 8 | 9 | 10 | 11 | 12 |
| Resin content ratio between the top and bottom insulating layers* | o | o | o | o | o | o | o | o | o | x |
| Appearance of the insulating layer** | o | o | o | o | o | x | x | x | x | x |
| Hardening conditions | (Room temperature - 210° C.)/1.5 h + (200° C.)/1.5 h | | | | | | | | | |

TABLE 5

|  | Comparison ||||||||||
| --- | --- | --- | --- | --- | --- | --- | --- | --- | --- | --- |
|  | 16 | 17 | 18 | 19 | 20 | 21 | 22 | 23 | 24 | 25 |
| Resin composition number | 1 | 2 | 3 | 4 | 5 | 8 | 9 | 10 | 11 | 12 |
| Resin content ratio between the top and bottom insulating layers* | x | x | x | x | x | o | o | o | x | x |
| Appearance of the insulating layer** | o | o | o | o | o | o | o | o | o | x |
| Hardening conditions | (Room temperature - 130° C.)/1 h + 130° C./5 h + (130–150° C.)/0.5 h + 150° C./ 5 h + (150–180° C.)/ 0.5 h + 180° C./15 h ||||||||||

In general, if the amount of setting accelerator is small, the initial temperature increase rate must be quickened and made higher, but in the case of acid anhydride setting epoxy resins a maximum hardening temperature of under 250 degrees centigrade is desirable. Also, the pot life is usually longer if less setting accelerator is used, but the setting time becomes longer and the various properties of the setting material tend to deteriorate.

In addition, if the initial temperature is higher than 200 degrees centigrade, conventional setting accelerators caused the resin to become black and bubble. The latent accelerators in this discovery do not blacken or bubble, and can produce good insulating layers.

In accordance with this invention, although this is dependent on the initial hardening temperature, and the type and amount of the setting accelerator, when the fluidity of the varnish on the coil surface is gone, hardening is done at a temperature at least 10 degrees lower than the initial temperature.

Although there are many different acid anhydride setting impregnating epoxy resins, when the fact that they will be hardened by quickly subjecting them to high temperatures is considered, it is necessary that the resin does not degrade when hardening. Therefore, a resin with a high degrading temperature is desirable. If the acid anhydride mix is within a conventional ratio, then it is not limited to those in the embodiments.

As setting accelerators which can be directly added to impregnating varnish, metal acetylacetonates, naphthenic acid metal salts, and octanoic acid metal salts allow long resin pot life and stable storage properties, but they have inferior hardening properties. Even if these are used with this invention, however, they can be prevented from seeping out of the impregnated insulating layer, so that a uniform resin layer can be obtained and a good insulating coil is possible.

The embodiments gave examples in which setting accelerators were mixed with insulating varnish, however, the objects of this invention can also be achieved by adding setting accelerators to the insulating material.

This invention can prevent the seeping out of varnish impregnating insulating layers, so that producing insulating coils with uniform resin content in the upper and lower parts is possible, and electrically insulated coils with high reliability can be obtained.

We claim:

1. A method of production of electrically insulated coils which make up insulating layers by winding insulating material around an electric conductor to form an insulating substrate and then applying impregnating varnish consisting of thermosetting resin to the insulating substrate so as to be hardened, said method of production comprising the steps of:

impregnating the insulating substrate with said impregnating varnish, so as to form an impregnated substrate;

heating the impregnated substrate at a presetting temperature, which will cause the impregnating varnish on the surface of the insulating substrate to lose its fluidity in under 30 minutes in order to preset the varnish after the insulating substrate is impregnated with the varnish, so as to prevent the varnish impregnated in the insulating substrate from seeping out therefrom, wherein the impregnating varnish is made up of acid anhydride setting epoxy resin elements that include latent accelerators and these accelerators take more than 30 days to increase their initial viscosity by three times during storage at 25 degrees centigrade; and then setting the varnish at a temperature at least 10 degrees centigrade lower than the presetting temperature.

2. A method of production of an electrically insulated coil as defined in claim 1, wherein the presetting temperature is from 170 to 250 degrees centigrade.

3. A method of production of an electrically insulated coil as defined in one of claim 1 or 2, wherein the latent accelerator in the impregnating varnish is at least one of metallic acetonate, metallic naphthenic acid and metallic octanoic acid.

4. A method of production of an electrically insulated coil as defined in claim 3, wherein the latent accelerator in the impregnating varnish is made up of at least one of the following: Co (II) acetylacetonate, Co (III) acetylacetonate, Co (II) benzoylacetonate, Mn (III) acetylacetonate, Fe (III) acetylacetonate, or Zr (IV) acetylacetonate.

5. A method of production of an electrically insulated coil as defined in claim 1, wherein the latent accelerator in the impregnating varnish is based on metallic naphthenate or metallic octanoate and the coordinating metal is at least one of the following: Co, Mn, and Zn.

6. A method of production of an electrically insulated coil as described in one of claim 1 or 2 in which there are 0.05 to 2 parts latent accelerator added to 100 parts impregnating varnish.

7. A method of production of an electrically insulated coil as described in claim 1, 2 or 5 wherein the insulating material is insulating tape backed with a backing member.

8. A method of production of an electrically insulated coil as described in claim 3, in which there are 0.05 to 2 parts latent accelerator added to 100 parts impregnating varnish.

9. A method of production of an electrically insulated coil as described in claim 4, in which there are 0.05 to 2 parts latent accelerator added to 100 parts impregnating varnish.

10. A method of production of an electrically insulated coil as described of claim 3, wherein the insulating material is insulating tape backed with a backing member.

11. A method of production of an electrically insulated coil as described of claim 4, wherein the insulating material is insulating tape backed with a backing member.

12. A method of production of an electrically insulated coil as described of claim 6, wherein the insulating material is insulating tape backed with a backing member.

13. A method of production of an electrically insulated coil as defined in claim 7, wherein said backing member is a glass cloth.

14. A method of production of an electrically insulated coil as defined in claim 13, wherein said insulating tape is mica tape.

15. A method of production of an electrically insulated coil as defined in claim 10, wherein said backing member is a glass cloth.

16. A method of production of an electrically insulated coil as defined in claim 15, wherein said insulating tape is mica tape.

17. A method of production of an electrically insulated coil as defined in claim 11, wherein said backing member is a glass cloth.

18. A method of production of an electrically insulated coil as defined in claim 17, wherein said insulating tape is mica tape.

19. A method of production of an electrically insulated coil as defined in claim 12, wherein said backing member is a glass cloth.

20. A method of production of an electrically insulated coil as defined in claim 19, wherein said insulating tape is mica tape.

21. A method of production of an electrically insulated coil as defined in claim 2, wherein said presetting temperature is from 180 to 230 degrees centigrade.

22. A method of production of an electrically insulated coil as defined in claim 6, in which there are 0.1 to 0.5 part latent accelerator added to 100 parts impregnating varnish.

23. A method of production of an electrically insulated coil as defined in claim 8, in which there are 0.1 to 0.5 part latent accelerator added to 100 parts impregnating varnish.

24. A method of production of an electrically insulated coil as defined in claim 9, in which there are 0.1 to 0.5 part latent accelerator added to 100 parts impregnating varnish.

* * * * *